United States Patent
Itazu

(10) Patent No.: US 12,123,488 B2
(45) Date of Patent: Oct. 22, 2024

(54) DRIVING FORCE TRANSMITTING DEVICE AND VEHICLE

(71) Applicant: TOYOTA JIDOSHA KABUSHIKI KAISHA, Toyota (JP)

(72) Inventor: Naoki Itazu, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 360 days.

(21) Appl. No.: 17/811,709

(22) Filed: Jul. 11, 2022

(65) Prior Publication Data
US 2023/0057225 A1    Feb. 23, 2023

(30) Foreign Application Priority Data
Aug. 19, 2021   (JP) ................... 2021-133943

(51) Int. Cl.
*F16H 57/02*   (2012.01)
*B60K 1/00*    (2006.01)
*B60K 17/04*   (2006.01)
*F16H 57/027*  (2012.01)
*F16H 57/037*  (2012.01)

(52) U.S. Cl.
CPC .......... *F16H 57/027* (2013.01); *B60K 17/04* (2013.01); *B60K 2001/001* (2013.01); *F16H 2057/02034* (2013.01); *F16H 2057/02052* (2013.01); *F16H 57/037* (2013.01)

(58) Field of Classification Search
CPC ............... F16H 57/027; F16H 57/037; F16H 2057/02034; F16H 2057/02052; B60K 17/04; B60K 2001/001
See application file for complete search history.

(56) References Cited

U.S. PATENT DOCUMENTS

| | | | | |
|---|---|---|---|---|
| 2,123,769 | A | * | 7/1938 | Cotal .................... F16H 57/037 475/284 |
| 5,129,422 | A | * | 7/1992 | Davison, Jr. .......... F16H 57/027 33/727 |
| 2003/0010151 | A1 | * | 1/2003 | Johnson .................. F16H 57/04 74/606 R |
| 2020/0406682 | A1 | | 12/2020 | Ogawa et al. |

FOREIGN PATENT DOCUMENTS

| | | |
|---|---|---|
| JP | 2021-052523 A | 4/2021 |
| JP | 2023027454 A * | 3/2023 |
| WO | WO 2019/172402 A1 | 9/2019 |

* cited by examiner

*Primary Examiner* — Adam D Rogers
(74) *Attorney, Agent, or Firm* — Oblon, McClelland, Maier & Neustadt, L.L.P.

(57) ABSTRACT

A driving force transmitting device includes an axle housing and a transaxle main body. The axle housing includes a supporting body and two shafts extending in opposite directions from the supporting body. The supporting body has an internal space. The transaxle main body is supported by the supporting body. The axle housing further includes a first breather plug. The first breather plug is fixed to the supporting body and is configured to discharge a gas in the internal space to an outside. The transaxle main body includes a gear mechanism, a case that accommodates the gear mechanism, and a second breather plug. The gear mechanism is configured to transmit a driving force. The second breather plug is fixed to the case and is configured to discharge a gas in the case to the outside. The second breather plug is located in the internal space.

5 Claims, 2 Drawing Sheets

DRIVING FORCE TRANSMITTING DEVICE AND VEHICLE

BACKGROUND

1. Field

The present disclosure relates to a driving force transmitting device and a vehicle.

2. Description of Related Art

Japanese Laid-Open Patent Publication No. 2021-052523 discloses a driving force transmitting device for a vehicle that includes a housing, a transmission mechanism, and a breather plug. The housing accommodates the transmission mechanism. The transmission mechanism includes an electric motor and a gear mechanism. The gear mechanism transmits driving force from the electric motor to driven wheels. The breather plug is attached to the housing. The breather plug discharges gas in the housing to the outside when the pressure inside the housing is relatively high.

When a vehicle equipped with the driving force transmitting device as disclosed in Japanese Laid-Open Patent Publication No. 2021-052523 travels along waterside such as a river, for example, splashed water may reach the breather plug. In such a case, the water or the like may enter the housing through the breather plug. In order to avoid such a consequence, the breather plug is preferably positioned as high as possible. However, since the driving force transmitting device disclosed in Japanese Laid-Open Patent Publication No. 2021-052523 is positioned in a lower part of the vehicle in general, there is a limit to restricting, for example, water entering the housing even if the position of the breather plug is raised.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a first aspect of the present disclosure, a driving force transmitting device is provided. The driving force transmitting device includes an axle housing and a transaxle main body. The axle housing includes a supporting body and two shafts extending in opposite directions from the supporting body. The supporting body has an internal space. The transaxle main body is supported by the supporting body. The axle housing includes a first breather plug fixed to the supporting body. The first breather plug is capable of discharging a gas in the internal space to an outside. The transaxle main body includes a gear mechanism that is used to transmit a driving force, a case that accommodates the gear mechanism, and a second breather plug fixed to the case. The second breather plug is configured to discharge a gas in the case to the outside. The second breather plug is located in the internal space.

With the above-described configuration, even if, for example, water is splashed onto the driving force transmitting device, the water is unlikely to reach the internal space of the supporting body. That is, water is unlikely to reach the second breather plug. Thus, water is prevented from entering the case through the second breather plug.

Gas in the case is discharged to the internal space of the supporting body by the second breather plug, and the gas in the internal space of the supporting body is discharged to the outside of the supporting body by the first breather plug. This prevents the pressure of the gas in the case from being excessively high.

In the above-described configuration, a position at which the second breather plug is located with respect to the gear mechanism is a position above the gear mechanism. The first breather plug may be located at a position above the second breather plug.

With the above-described configuration, for example, water is reliably restricted from entering the internal space of the supporting body through the first breather plug, as compared to a case in which the plug main body of the first breather plug is located at the same height as the second breather plug.

In the above-described configuration, when the driving force transmitting device is viewed from above, the second breather plug may be located in a section different from a section of the supporting body to which the first breather plug is fixed.

Even if, for example, water enters the internal space of the supporting body through the first breather plug, the above-described configuration restricts water that drops from a section of the supporting body to which the first breather plug is fixed from reaching the second breather plug.

In the above-described configuration, the first breather plug may include a hose having a first end that is fixed to the supporting body, and a plug main body that is connected to a second end of the hose. The second end is on a side of the hose opposite to the first end. The hose may be flexible.

The above-described configuration allows the plug main body to be located at a position that is unlikely to be splashed with, for example, water, for example, at a position above the supporting body. This reduces the possibility that water will enter the internal space of the supporting body through the first breather plug.

In accordance with a second aspect of the present disclosure, a vehicle is provided that includes the driving force transmitting device according to the first aspect, a motor-generator as a drive source of the vehicle, and a battery that supplies power to the motor-generator. With reference to a front side and a rear side of the vehicle, the driving force transmitting device and the battery are arranged in a front-rear direction of the vehicle.

In the above-described vehicle, since the battery has a relatively large volume in general, the bottom surface of the vehicle tends to be low in a portion where the battery is located. In this case, when the vehicle travels, for example, along waterside such as a river, for example, water is likely to splash near the driving force transmitting device since there is no space into which the water escapes around the battery. It is thus particularly advantageous to employ, in this vehicle, the technique of the present disclosure, which is related to a driving force transmitting device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

<Schematic Structure of Vehicle>

Hereinafter, one embodiment of the present disclosure will be described with reference to FIGS. 1 and 2. In the following description, upward, downward, forward, rearward, leftward, and rightward directions of a vehicle 100 will be used as references.

Figure 1:
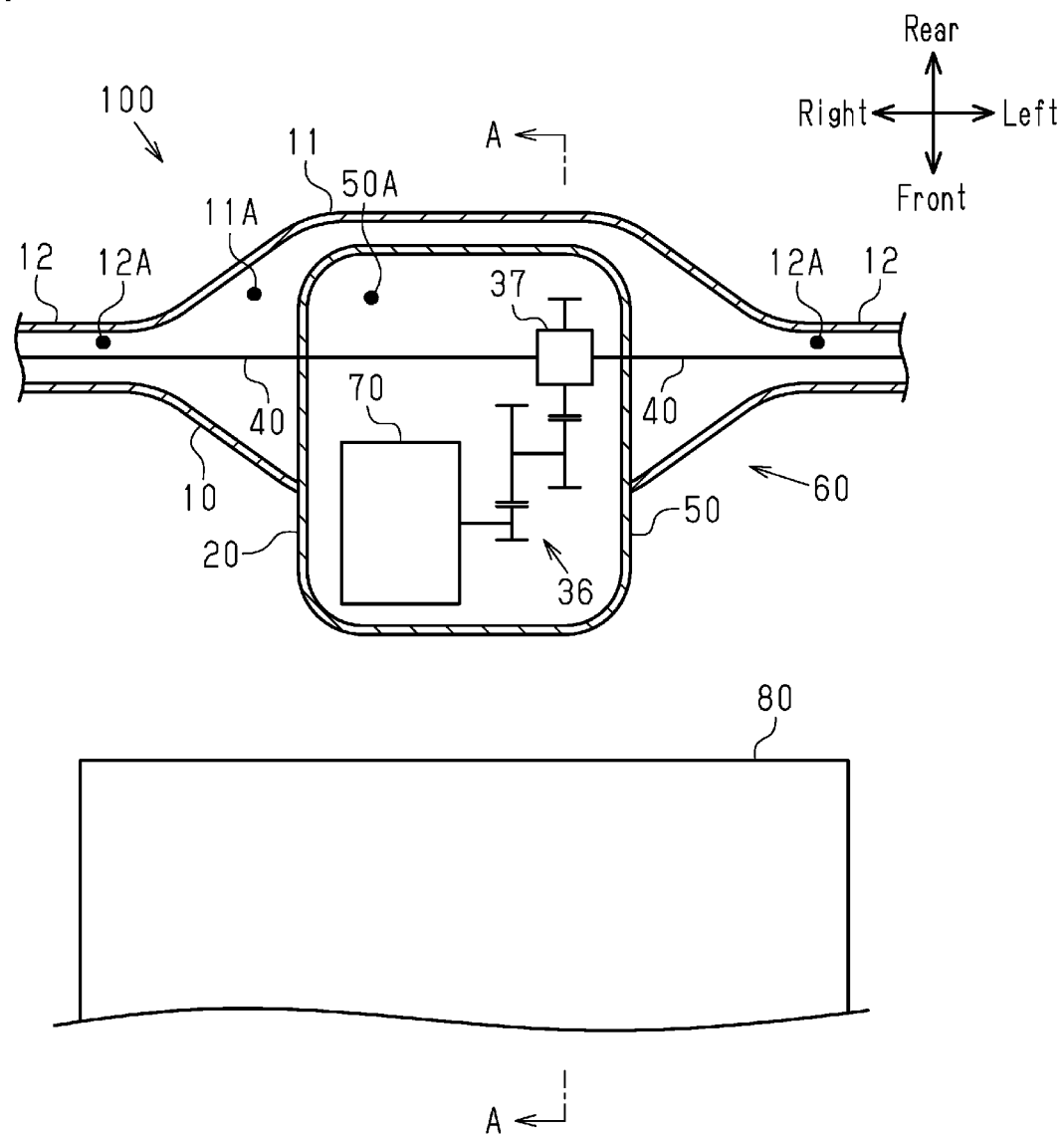
FIG. 1 is a cross-sectional view of a driving force transmitting device.

As shown in FIG. 1, the vehicle 100 includes a driving force transmitting device 60 and a motor-generator 70. The vehicle 100 is a battery electric vehicle that is driven by driving force of the motor-generator 70, which serves as a drive source. The driving force is transmitted by the driving force transmitting device 60.

The driving force transmitting device 60 includes an axle housing 10 and a transaxle main body 20.

The axle housing 10 is supported, for example, by a framework (not shown) of the vehicle 100. The axle housing 10 includes a supporting body 11 and two shaft portions 12. The supporting body 11 is container-shaped as a whole. That is, the supporting body 11 includes an internal space 11A. The supporting body 11 includes an opening that connects the internal space 11A to the outside of the supporting body 11. The supporting body 11 supports the transaxle main body 20. One of the two shaft portions 12 extends rightward from the right end of the supporting body 11. The other one of the two shaft portions 12 extends leftward from the left end of the supporting body 11. Each shaft portion 12 substantially has the shape of a hollow cylinder. That is, each shaft portion 12 includes an internal space 12A. The internal space 12A of each shaft portion 12 is connected to the internal space 11A of the supporting body 11. The internal space 11A of the supporting body 11 and the internal spaces 12A of the shaft portions 12 form a closed space.

The supporting body 11 bulges upward, downward, forward and rearward with respect to the shaft portions 12. The supporting body 11 has the appearance of a laterally elongated ellipse. The driving force transmitting device 60 is therefore a banjo type driving force transmitting device.

As shown in FIG. 1, the transaxle main body 20 includes a speed reduction mechanism 36, a differential 37, axles 40, and a case 50. The case 50 is container-shaped as a whole. That is, the case 50 includes an accommodation space 50A, which is an internal space. The case 50 is fitted to the opening of the supporting body 11. In other words, the case 50 is supported by the supporting body 11. Part of the case 50 is located in the internal space 11A of the supporting body 11.

The case 50 accommodates the motor-generator 70, the speed reduction mechanism 36, and the differential 37. That is, the motor-generator 70, the speed reduction mechanism 36, and the differential 37 are located in the accommodation space 50A. The case 50 stores oil for lubricating the motor-generator 70, the speed reduction mechanism 36, and the differential 37. The accommodation space 50A is a closed space.

The motor-generator 70 includes an output shaft that is coupled to the left and right axles 40 with the speed reduction mechanism 36 and the differential 37 in between. Thus, the driving force from the motor-generator 70 is transmitted to the left and right axles 40 through the speed reduction mechanism 36 and the differential 37. The speed reduction mechanism 36 transmits the driving force from the motor-generator 70 to the differential 37 while reducing the rotation speed of the output shaft of the motor-generator 70. The differential 37 allows the rotation speeds of the left and right axles 40 to differ from each other. In the present embodiment, the speed reduction mechanism 36 and the differential 37 are both gear mechanisms, which transmit driving force.

The vehicle 100 includes a battery 80. The battery 80 is a rechargeable battery. The battery 80 supplies power to the motor-generator 70. The battery 80 has the appearance of a flattened rectangular parallelepiped. The battery 80 is located in front of the driving force transmitting device 60. The driving force transmitting device 60 and the battery 80 are arranged in the front-rear direction.

<Structures Surrounding Breather Plugs>

Figure 2:
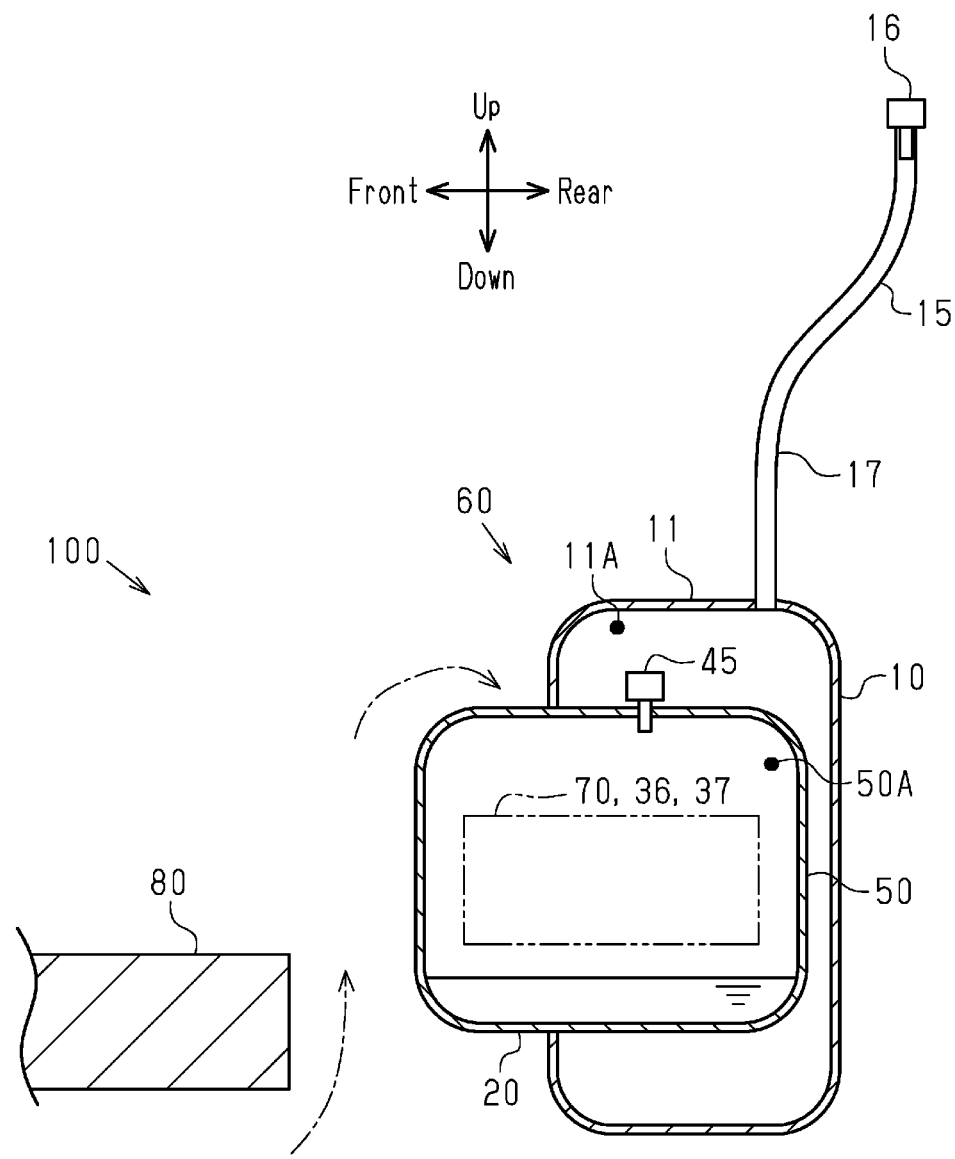
FIG. 2 is a cross-sectional view taken along line A-A in FIG. 1, illustrating the driving force transmitting device.

As shown in FIG. 2, the axle housing 10 further includes a first breather plug 15. The first breather plug 15 includes a plug main body 16 and a hose 17. The hose 17 is flexible. An example of the material of the hose 17 is rubber. The hose 17 includes a first end and a second end. The first end is fixed to an upper wall of the supporting body 11, which is located above the transaxle main body 20. The plug main body 16 is connected to the second end, which is on the side opposite to the first end. The plug main body 16 is fixed, for example, to the framework (not shown) of the vehicle 100 that is located above the supporting body 11 with mounting members such as clamps and brackets. That is, the plug main body 16 is located above the supporting body 11. The plug main body 16 discharges gas in the internal space 11A to the outside via the hose 17 when the pressure of the gas in the internal space 11A of the supporting body 11 is greater than or equal to a specified pressure. That is, the first breather plug 15 is capable of discharging gas in the internal space 11A of the supporting body 11 to the outside.

The transaxle main body 20 further includes a second breather plug 45. The second breather plug 45 is fixed to an upper wall of the case 50. That is, the second breather plug 45 is located above all of the motor-generator 70, the speed reduction mechanism 36, and the differential 37. The second breather plug 45 is located in the internal space 11A of the supporting body 11. Further, the second breather plug 45 is located forward of a section of the supporting body 11 to which the hose 17 of the first breather plug 15 is fixed. That is, when the driving force transmitting device 60 is viewed from above, the second breather plug 45 is located in a section different from the section of the supporting body 11 to which the hose 17 of the first breather plug 15 is fixed.

As described above, the first breather plug 15 is fixed to the upper wall of the supporting body 11. The case 50 of the transaxle main body 20 is fitted into the opening of the supporting body 11. Thus, the plug main body 16 of the first breather plug 15 is located above the second breather plug 45. The motor-generator 70, the speed reduction mechanism 36, and the differential 37 are simplified in FIG. 2.

The second breather plug 45 discharges gas in the accommodation space 50A of the case 50 to the outside when the pressure of the gas in the accommodation space 50A is greater than or equal to a specified pressure. That is, the second breather plug 45 is capable of discharging gas in the accommodation space 50A of the case 50 to the outside.

With respect to the speed reduction mechanism 36 and the differential 37, the second breather plug 45 is located in an upper part of the driving force transmitting device 60. Therefore, in the present embodiment, the upper side of the vehicle 100 agrees with the upper side of the driving force transmitting device 60.

Operation of Present Embodiment

For example, when the vehicle 100 travels along waterside such as a river, for example, water under the vehicle 100 may be splashed as indicated by the long-dash short-dash lines in FIG. 2. If water is splashed between the battery 80 and the driving force transmitting device 60, the water may reach the case 50 of the driving force transmitting device 60 and the supporting body 11.

Advantages of Present Embodiment (1) In the present embodiment, the second breather plug 45 is located in the internal space 11A of the supporting body 11. Thus, even if, for example, water is splashed onto the case 50 and the supporting body 11, the water is unlikely to reach the internal space 11A of the supporting body 11. That is, even if water is splashed onto the driving force transmitting device 60, the water is unlikely to reach the second breather plug 45. Accordingly, water is restricted from entering the accommodation space 50A of the case 50 through the second breather plug 45.

Gas in the accommodation space 50A of the case 50 is discharged to the internal space 11A of the supporting body 11 by the second breather plug 45. Then, gas in the internal space 11A of the supporting body 11 is discharged to the outside of the supporting body 11 by the first breather plug 15. This prevents the pressure of the gas in the accommodation space 50A of the case 50 and that in the internal space 11A of the supporting body 11 from being excessively high.

(2) In the present embodiment, the plug main body 16 of the first breather plug 15 is located at a position above the second breather plug 45. Accordingly, for example, water is reliably restricted from entering the internal space 11A of the supporting body 11 through the first breather plug 15, as compared to a case in which the plug main body 16 of the first breather plug 15 is located at the same height as the second breather plug 45.

(3) In the present embodiment, the hose 17 of the first breather plug 15 is flexible. The flexibility of the hose 17 allows the plug main body 16 to be pulled up to and fixed at a position above the supporting body 11. That is, the plug main body 16 is located at a position that is unlikely to be splashed with, for example, water. This reduces the possibility that water will enter the internal space 11A of the supporting body 11 through the first breather plug 15.

(4) It is now supposed that the second breather plug 45 includes a hose and a plug main body, like the first breather plug 15. It is also supposed that the plug main body of the second breather plug 45 is fixed to the case 50 via the hose. This configuration would complicate the structure of the driving force transmitting device 60 and increase the costs of the driving force transmitting device 60.

In the present embodiment, the second breather plug 45 does not include a hose, but is directly fixed to the case 50. Thus, the present embodiment limits complication of the structure of the driving force transmitting device 60 and limits increase in the costs of the driving force transmitting device 60, as compared to a case in which the second breather plug 45 includes a hose and a plug main body.

(5) It is now supposed that, for example, water has entered the internal space 11A of the supporting body 11 through the first breather plug 15. The entered water would drop downward from the section of the supporting body 11 to which the hose 17 of the first breather plug 15 is fixed.

In the present embodiment, when the driving force transmitting device 60 is viewed from above, the second breather plug 45 is located in a section different from the section of the supporting body 11 to which the hose 17 of the first breather plug 15 is fixed. Thus, even if, for example, water drops from the section of the supporting body 11 to which the hose 17 of the first breather plug 15 is fixed, the water is restricted from reaching the second breather plug 45.

(6) Since the battery 80 has a relatively large volume in general, the bottom surface of the vehicle 100 tends to be low in a portion where the battery 80 is located. The driving force transmitting device 60 and the battery 80 are arranged in the front-rear direction. In this case, when the vehicle 100 travels along a waterside such as a river, for example, water is likely to splash up between the battery 80 and the driving force transmitting device 60 since there is no space into which the water escapes around the battery 80. The present embodiment employs the technique related to the second breather plug 45 in a structure in which water is likely to splash onto the driving force transmitting device 60. Accordingly, water is further reliably restricted from entering the accommodation space 50A of the case 50.

Modifications

The above-described embodiment may be modified as follows. The above-described embodiment and the following modifications can be combined as long as the combined modifications remain technically consistent with each other.

In the above-described embodiment, the configuration of the first breather plug 15 in the driving force transmitting device 60 may be changed.

For example, the hose 17 of the first breather plug 15 may be replaced by a connecting pipe that is not flexible. This configuration also allows the plug main body 16 to be located above the supporting body 11 as long as the connecting pipe extends upward from the supporting body 11.

For example, the first breather plug 15 may include only the plug main body 16. That is, the hose 17 may be omitted. This configuration also allows the first breather plug 15 to discharge gas in the internal space 11A of the supporting body 11 to the outside as long as the plug main body 16 is fixed to a wall of the supporting body 11.

For example, it is possible to change the section of the supporting body 11 to which the first breather plug 15 is fixed, that is, the section to which the hose 17 is fixed. Specifically, the first end of the hose 17 may be fixed to a rear wall or a bottom wall of the supporting body 11. If the second end of the hose 17 is routed to a position above the supporting body 11, the plug main body 16 will be arranged above the supporting body 11 regardless of the position of the first end of the hose 17.

For example, the positional relationship between the plug main body 16 of the first breather plug 15 and the second breather plug 45 may be changed. Specifically, the plug main body 16 of the first breather plug 15 may be located at the same height as the second breather plug 45 or below the second breather plug 45. In this configuration, the plug main body 16 of the first breather plug 15 is preferably located at a position that is unlikely to be splashed with, for example, water.

In the above-described embodiment, the configuration of the second breather plug 45 in the driving force transmitting device 60 may be changed.

For example, the second breather plug 45 does not necessarily need to be located forward of the section of the supporting body 11 to which the hose 17 of the first breather plug 15 is fixed, but may be located on the right side of, on the left side of, or behind that section.

Further, when the driving force transmitting device 60 is viewed from above, the second breather plug 45 may be located at the same position as the section of the supporting body 11 to which the hose 17 of the first breather plug 15 is fixed. With these configurations, the second breather plug 45 is reliably restricted from being splashed with, for example, water, as compared to a configuration in which the second breather plug 45 is located outside the internal space 11A of the supporting body 11.

For example, the second breather plug 45 may include a hose and a plug main body like the first breather plug 15, and the plug main body may be fixed to the case 50 with the hose. This configuration also restricts, for example, water from entering the accommodation space 50A of the case 50 through the second breather plug 45 if the plug main body of the second breather plug 45 is located in the internal space 11A of the supporting body 11. This configuration also allows the plug main body of the second breather plug 45 to be arranged at the highest position in the internal space 11A.

The configuration of the driving force transmitting device 60 in the above-described embodiment is only exemplary. For example, the transaxle main body 20 may include only one of the speed reduction mechanism 36 and the differential 37. The transaxle main body 20 may also include an additional component. It suffices if the transaxle main body 20 includes only one gear mechanism.

In the above-described embodiment, the configuration other than the driving force transmitting device 60 of the vehicle 100 may be changed.

For example, the battery 80 may be located behind the driving force transmitting device 60. Even in this case, the driving force transmitting device 60 and the battery 80 are arranged in the front-rear direction. Also, the positional relationship between the battery 80 and the driving force transmitting device 60 is not limited to positions in the front-rear direction. Further, if the vehicle 100 does not include the motor-generator 70 as a drive source, the battery 80 may not be located in the vicinity of the driving force transmitting device 60.

For example, the motor-generator 70 may be located outside the accommodation space 50A of the case 50. This configuration also allows the driving force of the motor-generator 70 to be transmitted to the left and right axles 40 if the output shaft of the motor-generator 70 is coupled to the speed reduction mechanism 36 in the accommodation space 50A of the case 50.

For example, the drive source of the vehicle 100 may be changed. Specifically, an internal combustion engine may be employed as a drive source of the vehicle 100 in addition to or in place of the motor-generator 70. That is, application of the technique of the present disclosure is not limited to battery electric vehicles.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A driving force transmitting device, comprising:
    an axle housing that includes a supporting body and two shafts extending in opposite directions from the supporting body, the supporting body having an internal space; and
    a transaxle main body supported by the supporting body, wherein
    the axle housing includes a first breather plug fixed to the supporting body, the first breather plug being configured to discharge a gas in the internal space to an outside,
    the transaxle main body includes:
        a gear mechanism that is configured to transmit a driving force;
        a case that accommodates the gear mechanism; and
        a second breather plug fixed to the case, the second breather plug being configured to discharge a gas in the case to the outside, and
    the second breather plug is located in the internal space.

2. The driving force transmitting device according to claim 1, wherein
    a position at which the second breather plug is located with respect to the gear mechanism is a position above the gear mechanism, and
    the first breather plug is located at a position above the second breather plug.

3. The driving force transmitting device according to claim 2, wherein, when the driving force transmitting device is viewed from above, the second breather plug is located in a section different from a section of the supporting body to which the first breather plug is fixed.

4. The driving force transmitting device according to claim 1, wherein
    the first breather plug includes:
        a hose having a first end, the first end being fixed to the supporting body; and
        a plug main body that is connected to a second end of the hose, the second end being on a side of the hose opposite to the first end, and
    the hose is flexible.

5. A vehicle, comprising:
    a driving force transmitting device;
    a motor-generator as a drive source of the vehicle; and
    a battery that supplies power to the motor-generator, wherein the driving force transmitting device includes:
  an axle housing that includes a supporting body and two shafts extending in opposite directions from the supporting body, the supporting body having an internal space; and
  a transaxle main body supported by the supporting body,
the axle housing further includes a first breather plug fixed to the supporting body, the first breather plug being configured to discharge a gas in the internal space to an outside,
the transaxle main body includes:
  a gear mechanism that is configured to transmit a driving force;
  a case that accommodates the gear mechanism; and
  a second breather plug fixed to the case, the second breather plug being configured to discharge a gas in the case to the outside,
the second breather plug is located in the internal space, and
with reference to a front side and a rear side of the vehicle, the driving force transmitting device and the battery are arranged in a front-rear direction of the vehicle.

* * * * *